US012746713B2

(12) United States Patent
Lopez Martinez

(10) Patent No.: US 12,746,713 B2
(45) Date of Patent: Sep. 29, 2026

(54) VEHICLE INTERIOR PANEL WITH REINFORCING LAYER AND RELATED METHOD

(71) Applicant: Faurecia Interior Systems, Inc., Auburn, MI (US)

(72) Inventor: Carlos Gerardo Lopez Martinez, Puebla (MX)

(73) Assignee: Faurecia Interior Systems USA Holdings, LLC, Auburn Hills, MI (US)

( * ) Notice: Subject to any disclaimer, the term of this patent is extended or adjusted under 35 U.S.C. 154(b) by 205 days.

(21) Appl. No.: 18/424,299

(22) Filed: Jan. 26, 2024

(65) Prior Publication Data

US 2025/0242526 A1 Jul. 31, 2025

(51) Int. Cl.
*B29C 45/14* (2006.01)
*B32B 5/02* (2006.01)
(Continued)

(52) U.S. Cl.
CPC .......... *B29C 45/14065* (2013.01); *B32B 5/02* (2013.01); *B32B 5/18* (2013.01); *B32B 9/025* (2013.01); *B32B 9/046* (2013.01); *B32B 9/047* (2013.01); *B32B 27/065* (2013.01); *B32B 27/12* (2013.01); *B32B 27/32* (2013.01);
(Continued)

(58) Field of Classification Search
CPC ...... G06T 2207/30196; B29C 45/0081; B29C 45/14065; B29C 45/14221; B29C 45/14262; B29C 45/14508; B29C 45/14786; B29L 2031/3008; B29L 2031/3038; B32B 2605/003; B32B 27/065; B32B 27/12; B32B 27/32; B32B 5/02; B32B 5/18; B32B 9/025; B32B 9/046;
(Continued)

(56) References Cited

U.S. PATENT DOCUMENTS 6,004,497 A 12/1999 Bisognin et al.
9,010,799 B2 4/2015 Hagl
(Continued)

FOREIGN PATENT DOCUMENTS

DE 102017210896 A 1/2019
FR 3115507 A 4/2022
(Continued)

OTHER PUBLICATIONS

Hurson et al (FR3109344) (Year: 2021).*
European Search Report corresponding to application EP25153889, dated Jun. 25, 2025, 11 pages.

*Primary Examiner* — Lawrence D Ferguson
(74) *Attorney, Agent, or Firm* — Reising Ethington P.C.

(57) ABSTRACT

A vehicle interior panel for use over an airbag includes a reinforcing layer overmolded with a molding material during a substrate molding operation. The substrate molding tool includes an extendable and retractable slide configured to clamp opposing edge portions of the reinforcing layer to a clamping surface of the tool to secure the reinforcing layer in a cavity of the molding tool to prevent unwanted movement of the layer when subjected to high pressure and high viscosity molding material when the mold cavity is filled. The opposing edge portions of the reinforcing layer are provided along separate pieces of the layer and/or along one or more openings formed through the layer.

20 Claims, 6 Drawing Sheets

(51) Int. Cl.

| | |
|---|---|
| ***B32B 5/18*** | (2006.01) |
| ***B32B 9/02*** | (2006.01) |
| ***B32B 9/04*** | (2006.01) |
| ***B32B 27/06*** | (2006.01) |
| ***B32B 27/12*** | (2006.01) |
| ***B32B 27/32*** | (2006.01) |
| ***B60R 21/2165*** | (2011.01) |
| *B29L 31/30* | (2006.01) |

(52) U.S. Cl.
CPC ... *B60R 21/2165* (2013.01); *B29L 2031/3038* (2013.01); *B32B 2605/003* (2013.01)

(58) Field of Classification Search
CPC .......... B32B 9/047; B60R 2021/21537; B60R 21/205; B60R 21/215; B60R 21/2165
See application file for complete search history.

(56) References Cited

U.S. PATENT DOCUMENTS

| | | | |
|---|---|---|---|
| 9,333,936 | B2 | 5/2016 | Schupbach |
| 11,117,541 | B2 | 9/2021 | Lesnik et al. |
| 11,390,237 | B2 | 7/2022 | Kobayashi |
| 2023/0031059 | A1 | 2/2023 | Lopez-Martinez et al. |

FOREIGN PATENT DOCUMENTS

| | | | |
|---|---|---|---|
| JP | H05253964 | A | 10/1993 |
| WO | 2023208543 | A1 | 11/2023 |

* cited by examiner

VEHICLE INTERIOR PANEL WITH REINFORCING LAYER AND RELATED METHOD

TECHNICAL FIELD

The present disclosure is related generally to vehicle interior panels and, more particularly, to vehicle interior panels configured for use over deployable airbags.

BACKGROUND

Vehicle interior panels that conceal airbag modules from view are often configured to split along a tear seam to form one or more airbag doors that pivot away from a surrounding portion of the panel to permit a deploying airbag to pass through the panel and into the vehicle passenger cabin in the event of a collision. Several means for ensuring the airbag door does not break away from the panel during airbag deployment have been proposed, including hinge reinforcements.

Co-owned U.S. Pat. No. 9,010,799 to Hagl describes a hinge reinforcement that may be molded into the substrate of such a panel by supporting the hinge reinforcement in a mold cavity using pins extending through openings formed through the hinge reinforcement material. One practical problem with the Hagl process is unwanted movement of the hinge reinforcement during the molding process. High injection pressures and flow gradients within the mold cavity can cause the hinge reinforcement to move out of position away from the support pins and, in some cases, wrinkle or fold back on itself, thereby reducing the bond strength between the molding material and the hinge reinforcement material.

SUMMARY

An embodiment of a method of making a vehicle interior panel for use over an airbag includes filling a mold cavity of a molding tool with a molding material to form a panel substrate while opposing edge portions of a flexible reinforcing layer are clamped in the molding tool. A portion of the reinforcing layer is overmolded with the molding material and embedded in an airbag door region of the panel.

An embodiment of the method includes the features of the previously listed embodiment, and the flexible reinforcing layer includes separate first and second pieces each providing one of the opposing edge portions. A portion of the first piece is embedded in a first airbag door of the panel, and a portion of the second piece is embedded in a second airbag door of the panel opposing the first airbag door.

An embodiment of the method includes the features of any previously listed embodiment, and the molding tool includes a slide. This embodiment includes clamping the opposing edge portions of the reinforcing layer between the slide and a clamping surface of the molding tool before the step of filling the mold cavity. The slide defines a portion of the molding surface delimiting the mold cavity.

An embodiment of the method includes the features of the previously listed embodiment, and the slide is configured to prevent an undercut condition with the molding material.

An embodiment of the method includes the features of any previously listed embodiment, and the molding tool includes a slide. This embodiment includes positioning the opposing edge portions between a head of the slide and a clamping surface of the molding tool while the molding tool is in an open condition and the slide is in an extended position. This embodiment also includes clamping the opposing edge portions between the head of the slide and the clamping surface of the molding tool by moving the slide to a retracted position before the step of filling.

An embodiment of the method includes the features of the previously listed embodiment, and a distance between the edge portions is less than a width of the head of the slide before and after the step of positioning such that the edge portions are in sliding contact with the head of the slide during the step of positioning and before the step of clamping.

An embodiment of the method includes the features of either of the two previously listed embodiments, and a clamping side of the head of the slide tapers away from a cavity side of the head of the slide.

An embodiment of the method includes the features of any previously listed embodiment, and the edge portions are defined along an opening formed through the reinforcing layer.

An embodiment of the method includes the features of any previously listed embodiment, and the edge portions are defined along a slit formed through the reinforcing layer.

An embodiment of the method includes the features of any previously listed embodiment, and the edge portions are defined along an opening formed through the reinforcing layer that includes a slit and an aperture located along the slit.

An embodiment of the method includes the features of any previously listed embodiment, and the reinforcing layer is provided as a single piece.

An embodiment of the method includes the features of any previously listed embodiment, and an entire length of each edge portion is clamped in the molding tool during the step of filling.

An embodiment of the method includes the features of any previously listed embodiment, and each edge portion extends away from a back side of the airbag door region of the panel and is devoid of molding material.

An embodiment of the method includes the features of any previously listed embodiment and additionally includes, before the step of filling: positioning the flexible reinforcing layer between first and second tool portions of the molding tool with the molding tool in an open condition and with a slide in an extended position and the opposing edge portions aligned with the slide; moving the reinforcing layer and the first tool portion relative to each other until the edge portions are located between a head of the slide and a clamping surface of the first tool portion; retracting the slide toward the clamping surface to a retracted position such that the edge portions are clamped between the head of the slide and the clamping surface; moving the first and second tool portions toward each other to change the molding tool to a closed condition to form the mold cavity; and removing the panel substrate from the molding tool after the step of filling.

An embodiment of the method includes the features of the previously listed embodiment, and a distance between the edge portions before and after step (b) is less than a width of the head of the slide such that the edge portions: flex away from the first tool portion during step (b), flex toward the first tool portion during step (c), and flex toward the first tool portion during step (e).

An embodiment of the vehicle interior panel for use over an airbag includes a panel substrate formed from a molding material, and a flexible reinforcing layer. A portion of the reinforcing layer is overmolded with the molding material and embedded in an airbag door region of the panel. Opposing edges portions of the flexible reinforcing layer are devoid of the molding material.

An embodiment of the vehicle interior panel includes the features of the previously listed embodiment, and an entire length of each edge portion is devoid of the molding material.

An embodiment of the vehicle interior panel includes the features of any previously listed embodiment and includes an H-shaped tear seam having an areal extent that defines the airbag door region.

An embodiment of the vehicle interior panel includes the features of any previously listed embodiment, and the opposing edges portions extend along a back side of opposing airbag doors of the panel.

An embodiment of the vehicle interior panel includes the features of any previously listed embodiment, and another portion of the reinforcing layer is overmolded with the molding material and embedded in a wall of a chute of the panel substrate.

An embodiment of the vehicle interior panel includes the features of any previously listed embodiment and is made according to the method of any previously listed embodiment.

It is contemplated that any number of the individual features of the above-described embodiments and of any other embodiments reflected in the claims, drawings, or description below can be combined in any combination to define a claimed invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described below is a vehicle interior panel for use over an airbag and related methods. The panel includes an embedded reinforcing layer which can be overmolded with a molding material during a substrate molding operation. The molding tool may be equipped with a slide configured to secure the reinforcing layer in a cavity of the molding tool in a manner that prevents unwanted movement of layer when subjected to high pressure and high viscosity molding material during injection.

Figure 1:
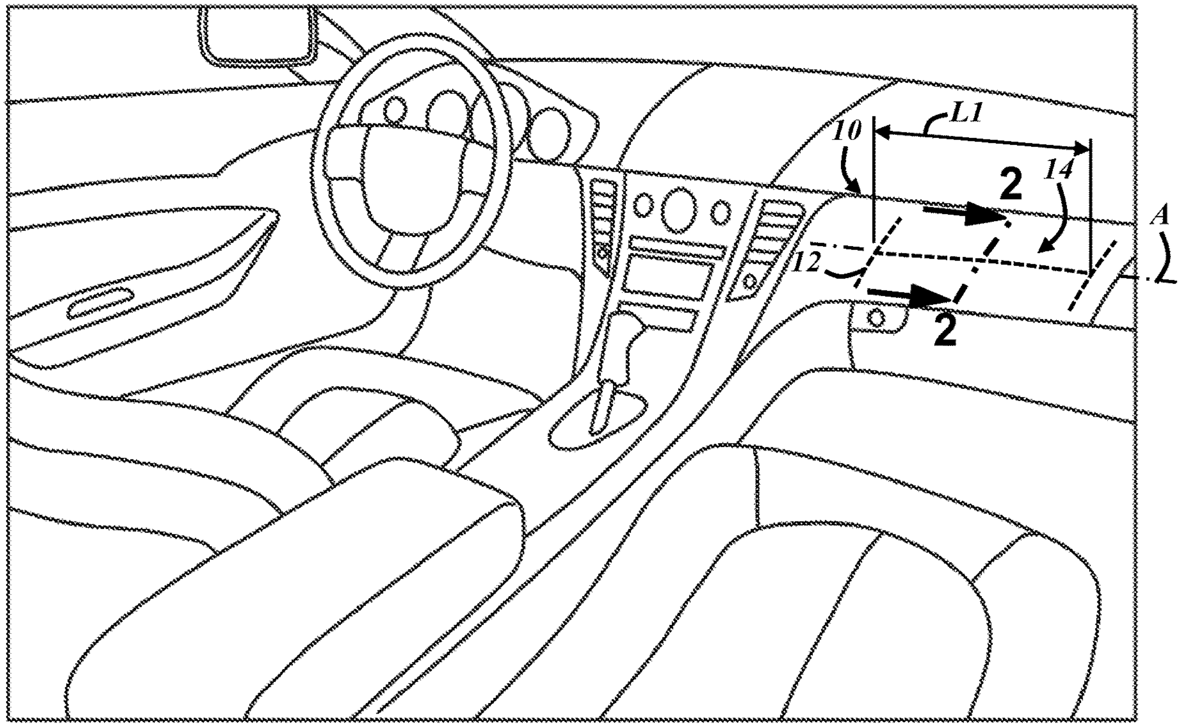
FIG. 1 is a perspective view of a portion of a vehicle interior including a vehicle interior panel for use over an airbag.

FIG. 1 is a perspective view of the forward part of a vehicle passenger cabin equipped with a vehicle interior panel 10. An inflatable airbag is installed behind the panel 10, and the panel has a tear seam 12 along which the panel splits during inflation and deployment of the airbag. The tear seam 12 is defined along one or more lines along which the panel 10 is intentionally weakened. This weakening may be in the form of perforations, locally thinned material, notches, or other stress concentrators included in one or more layers of the panel. The illustrated panel 10 is an instrument panel or dashboard, and the tear seam 12 is in an H-shape, the areal extent of which defines an airbag door region 14.

Figure 2:
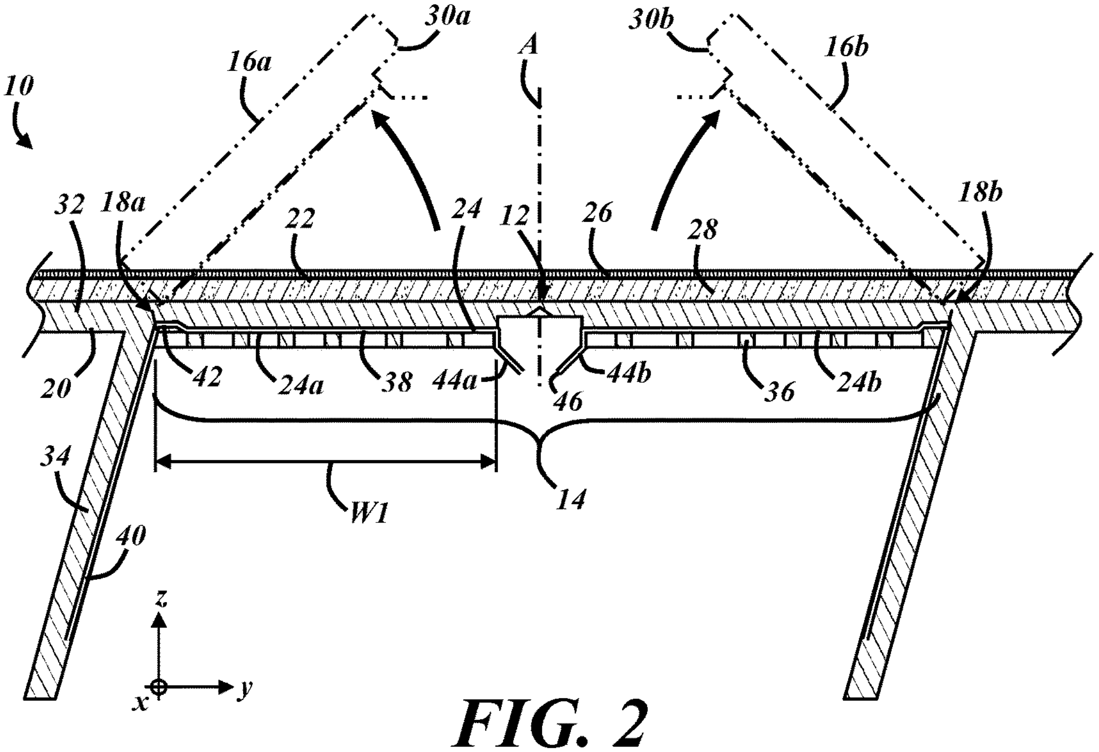
FIG. 2 is a cross-sectional view of the panel of FIG. 1.

FIG. 2 is a cross-sectional view of the panel 10 of FIG. 1 taken across a central plane A of the airbag door region 14, which is an x-z plane in FIG. 2 passing through and parallel with the crossbar of the H-shape of the tear seam 12. During airbag deployment, airbag inflation forces cause the panel 10 to split along the tear seam 12, and an opposing pair of airbag doors 16*a*, 16*b* pivot along respective hinges 18*a*, 18*b* or otherwise move outwardly away from the surrounding portion of the panel, as illustrated in phantom in FIG. 2. While illustrated in the context of an instrument panel 10 and an H-shaped tear seam 12, the structures and methods described below are adaptable to other vehicle interior panels (e.g., door panels, steering wheel panels, pillar panels, seat panels, etc.) and to other tear seam shapes (e.g., U-shape, Y-shape, X-shape, non-symmetric shapes, etc.). The crossbar of the H-shape need not be perpendicular to the uprights of the H-shape.

The illustrated panel 10 is a multi-layer panel including a panel substrate 20, a decorative covering 22, and a flexible reinforcing layer 24. The panel substrate 20 may be formed from a polymer-based material (e.g., glass-filled polypropylene, TPO, TPE) in a molding operation and provides the overall shape and structure of the finished panel 10. The decorative covering 22 provides the outer surface of the panel 10 that faces the interior of the vehicle passenger cabin when installed in the vehicle. The illustrated decorative covering 22 is a two-layer component including a decorative outer skin layer 26 (e.g., polymer film or leather) and an intermediate layer 28 (e.g., foam or spacer fabric) between the substrate 20 and skin layer.

The tear seam 12 in this example includes a notch formed along the back side of the substrate 20. Although not illustrated here, the decorative covering 22 may also include stress concentrators along the tear seam 12. Alternatively or additionally, the substrate 20 may include perforations or through-openings along opposing edges 30*a*, 30*b* of the airbag doors 16*a*, 16*b* lying along the central plane A of the airbag door region 14. The opposing edges 30*a*, 30*b* are the leading edges of the airbag doors 16*a*, 16*b* during airbag deployment and are located along a side of each airbag door opposite the respective hinges 18*a*, 18*b*. This is only one example of a vehicle interior panel 10 for use over an airbag. In other iterations, the panel 10 is a drop-in airbag module or an underlying airbag module attached along the outer or inner side of a surrounding panel having an airbag deployment opening aligned with the airbag door region 14. The decorative covering 22 is optional and may be a monolayer or a backfilled skin layer in other examples.

The panel substrate 20 includes a main body 32 and a chute 34. The body 32 provides the contour of the panel underlying and directly supporting the decorative covering 22. The chute 34 is formed by one or more walls extending away from the back side of the body 32 and at least partially surrounds the airbag door region 14. The illustrated chute 34 is integrally molded as one-piece with the body 32 and is configured to constrain and guide the deploying airbag toward the deployment opening when the tear seam 12 splits and the airbag doors 16*a*, 16*b* open. The illustrated panel substrate 20 also includes a network of stiffening ribs 36 along the back side of the airbag door region 14 and airbag doors 16*a*, 16*b*. The ribs 36 may be overmolded onto the reinforcing layer 24 in the same molding operation as the main body 32 and chute 34.

The reinforcing layer 24 is at least partially embedded in the airbag door region 14 of the panel 10 and, more particularly, in the material of the panel substrate 20. The reinforcing layer 24 functions as a tether intended to prevent the airbag doors 16*a*, 16*b* from separating from the remainder of the panel 10 during airbag deployment—i.e., the reinforcing layer 24 reinforces the hinges 18*a*, 18*b*. The reinforcing layer 24 can be of any suitable material and construction and may be referred to as a flexible reinforcing layer, indicating that the force required to bend the sheet-like layer 24 out of plane is negligible in comparison to the force required to bend the substrate 20 in which it is embedded.

The flexible reinforcing layer 24 may be in the form of a fabric or a film. A fabric reinforcing layer 24 may be woven or non-woven and may have little to no flexural modulus—e.g., it cannot extend horizontally while supporting its own weight. The fabric may be made from or include natural and/or synthetic fibers (e.g., nylon or other polymer, glass, metal, or carbon fibers) that provide the reinforcing layer with a tensile strength that is greater than that of the material of the substrate 20. A film reinforcing layer 24 may be a polymer film or metal foil. In a specific embodiment, the reinforcing layer 24 is net including fibers (e.g., polyester or aramid) oriented in multiple planar directions with openings into which the overmolded substrate material can flow. The reinforcing layer 24 may include a polymeric coating on the film or fibers configured to enhance bonding between the reinforcing layer and the substrate material.

In the illustrated example, the reinforcing layer 24 includes separate first and second pieces 24*a*, 24*b* associated with the respective airbag doors 16*a*, 16*b*. Each piece 24*a*, 24*b* of the illustrated reinforcing layer 24 includes a first portion 38 embedded in the respective airbag door 16*a*, 16*b*, a second portion 40 embedded in a wall of the chute 34, a third portion 42 interconnecting the first and second portions at the respective hinge 18*a*, 18*b*, and an edge portion 44*a*, 44*b* that is not embedded in the panel substrate 20.

The first portion 38 of each piece of the reinforcing layer 24 extends along the entire width W1 of the back side of the respective airbag door 16*a*, 16*b* and spans at least a majority and up to about 95% of the length L1 (FIG. 1) of each airbag door. While the second portion 40 of each piece of the reinforcing layer 24 is embedded in the chute 34 in this example, it may be embedded in or otherwise attached to a frame or other portion of the main body 32 of the substrate 20.

The edge portions 44*a*, 44*b* extend from and along the back side of the airbag door region 14 and oppose each other across a gap straddling the central plane A of the region and in line with portion of the tear seam illustrated in FIG. 2. The opposing edge portions 44*a*, 44*b* also extend along the back side and along at least a majority of the length L1 of the respective airbag door 16*a*, 16*b*—i.e., along the crossbar of the H-shape of the tear seam 12. As a result of the methods described below, each edge portion 44*a*, 44*b* is devoid of molding material used to mold the substrate 20. Each edge portion 44*a*, 44*b* includes a free edge 46 along with small portions of the opposite faces of the reinforcing layer 24. The free edge 46 is a raw or cut edge of the sheet of material from which the reinforcing layer 24 is made and is not a folded edge or part of a loop of material. The edge portions 44*a*, 44*b* are located away from and are not part of the airbag door hinges 18*a*, 18*b*.

FIGS. 3-8 schematically illustrate portions of an embodiment of a method of making a vehicle interior panel 10 for use over an airbag, such as the panel of FIGS. 1 and 2. The method may generally include filling a mold cavity of a molding tool 100 while edge portions 44*a*, 44*b* of the reinforcing layer 24 are clamped in the tool. It should be understood that FIGS. 3-8 are schematic in nature and that the molding tool 100 may include unillustrated features, such as cooling channels, ejector pins, vents, other slides or lifters, and/or may be part of a larger system that includes a molding press and other machines (e.g., robots) that interact with the system.

Figure 3:
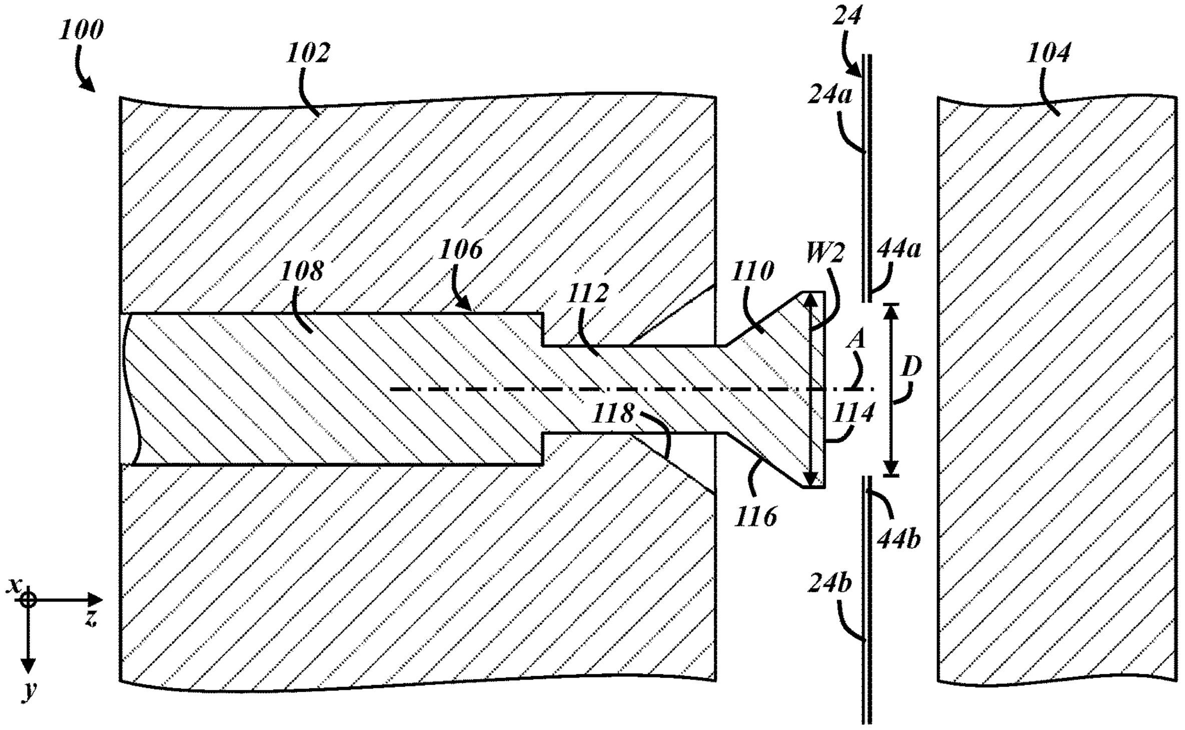
FIG. 3 is a schematic cross-sectional view depicting opposing edge portions of a flexible reinforcing layer aligned with a slide of a molding tool.

FIG. 3 is a cross-sectional view of a portion of a substrate molding tool 100 including first and second tool portions 102, 104 and a slide 106 associated with the first tool portion. At least one of the first and second tool portions 102, 104 is moveable toward and away from the other to change the tool 100 between the illustrated open condition, in which opposing faces of the tool portions 102, 104 are separated, and a closed condition, in which the tool portions are in contact under the force of a molding press. The portion of the molding tool 100 depicted in FIG. 3 corresponds to the location of the central plane A of the substrate panel 20 to be molded—i.e., where the opposing edges 30*a*, 30*b* of the airbag doors 16*a*, 16*b* of the finished panel substrate 20 are formed. The slide 106 is moveable relative to the first tool portion 102 between an extended position, as shown in FIG. 3, and a retracted position. Slide movement is uniaxial in the same direction as the relative movement of the tool portions 102, 104—back and forth in the z-direction of FIG. 3. No portion of the slide moves in any other direction.

The slide 106 includes a body 108, a head 110, and a neck 112 interconnecting the body and the head. The body 108 and neck 112 are guided along internal surfaces of the first tool portion 102 during slide movement. The head 110 of the slide 106 has a maximum width W2 that is greater than that of the neck 112. The head 110 has a front or cavity side 114 facing toward the second tool portion 104 and an opposite rear or clamping side 116 facing toward the first tool portion 102. The clamping side 116 tapers down in a direction away from the second tool portion 104 from the maximum width W2 to the narrower neck 112. The first tool portion 102 includes a clamping surface 118 complementary in shape with the clamping side 116 of the head 110 of the slide 106.

Embodiments of the method include positioning the flexible reinforcing layer 24 between the first and second tool portions 102, 104 of the molding tool 100 with the molding tool in the open condition and with the slide 106 in the extended position, as shown in FIG. 3. In this case, the reinforcing layer 24 includes separate first and second pieces 24*a*, 24*b*. The reinforcing layer 24 is positioned between the head 110 of the slide 106 and the second tool portion 104 with the edge portions 44*a*, 44*b* of the layer aligned with the slide 106 and opposing each other (i.e., facing each other) across a gap. A distance D across the gap and between the opposing edge portions 44*a*, 44*b* is less than the width W2 of the head 110 of the slide 106. The reinforcing layer 24 may be supported between the tool portions 102, 104 as in FIG. 3 manually, via other machinery, such as a pick-and-place machine, or on horizontally extending pins, for example.

Figure 4:
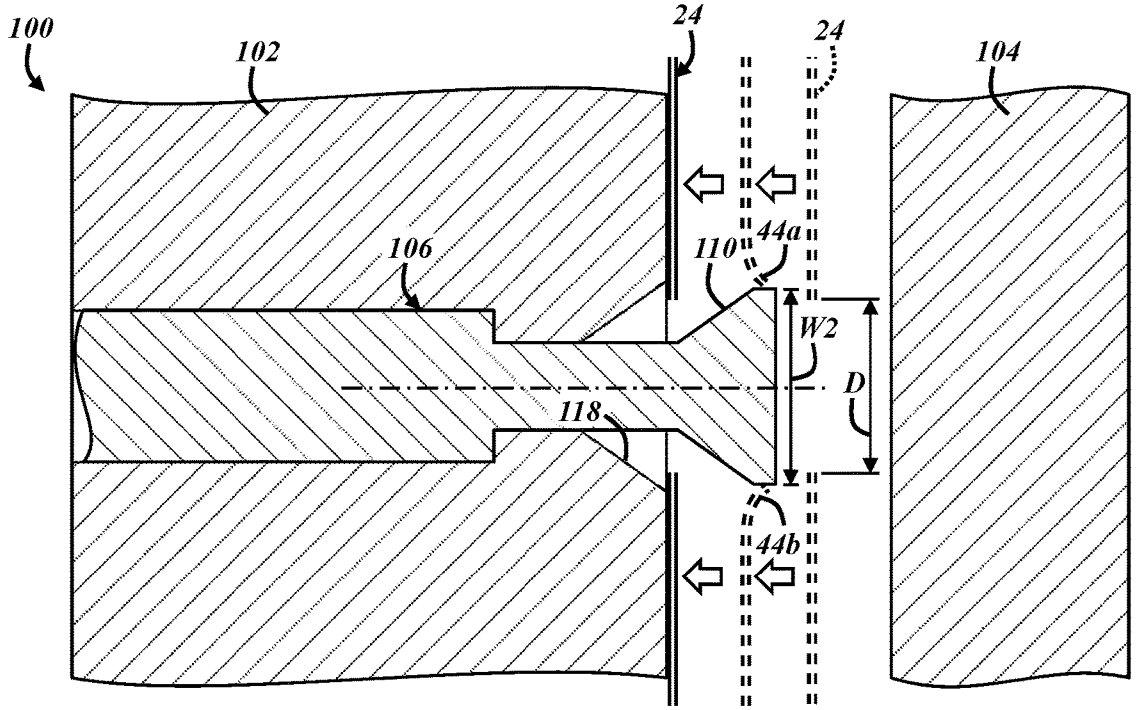
FIG. 4 depicts the reinforcing layer of FIG. 3 moving past a head of the slide.

With reference to FIG. 4, at least one of the reinforcing layer 24 and the first tool portion 102 is then moved toward the other. The illustrated movement is translational movement in the same direction as the relative movement of the tool portions 102, 104. The reinforcing layer 24 may for example be translated toward the first tool portion 102 by the same person or equipment supporting it in FIG. 3, or by some component of the second tool portion 104. Movement of the reinforcing layer 24 is continued until the opposing edge portions 44*a*, 44*b* are located between the head 110 of the slide 106 and the clamping surface 118 of the first tool portion. During this movement, due to the distance D being less than the width W2 of the head 110 of the slide 106, the edge portions 44*a*, 44*b* are temporarily in sliding contact with the head of the slide and flex away from the first tool portion 102, as shown in broken lines in FIG. 4. The reinforcing layer 24 may be brought into contact with surfaces of the first tool portion 102 before the movement is stopped.

Figure 5:
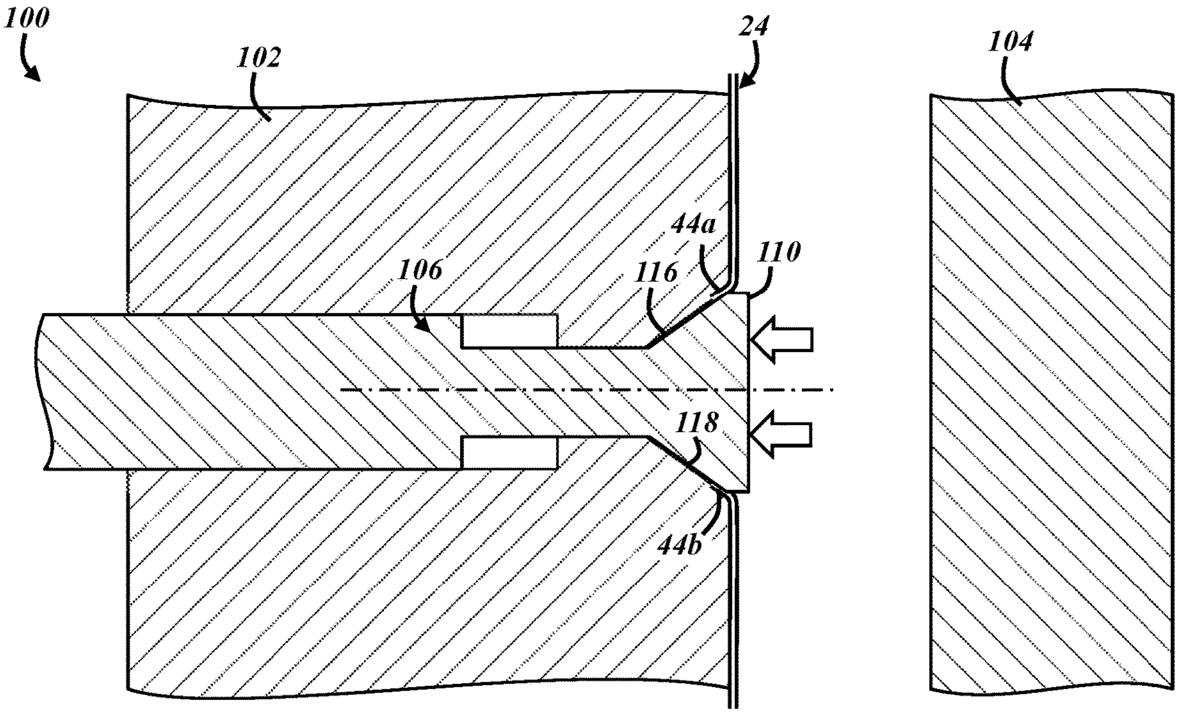
FIG. 5 depicts the reinforcing layer of FIG. 4 after the slide moves to a retracted position.

With reference to FIG. 5, the slide 106 is then moved relative to the first tool portion 102 to the retracted position. In the retracted position, the opposing edge portions 44*a*, 44*b* of the reinforcing layer 24 are clamped between the clamping surface 118 of the first tool portion 102 and the clamping side 116 of the head 110 of the slide 106. This movement again causes the edge portions 44*a*, 44*b* to come into contact with the head 110 of the slide 106 such that the clamping side 116 of the head of the slide flexes the edge portions of the reinforcing layer 24 toward the first tool portion 102. If necessary, the previous support for the reinforcing layer can be withdrawn or removed once the slide 106 is retracted.

Figure 6:
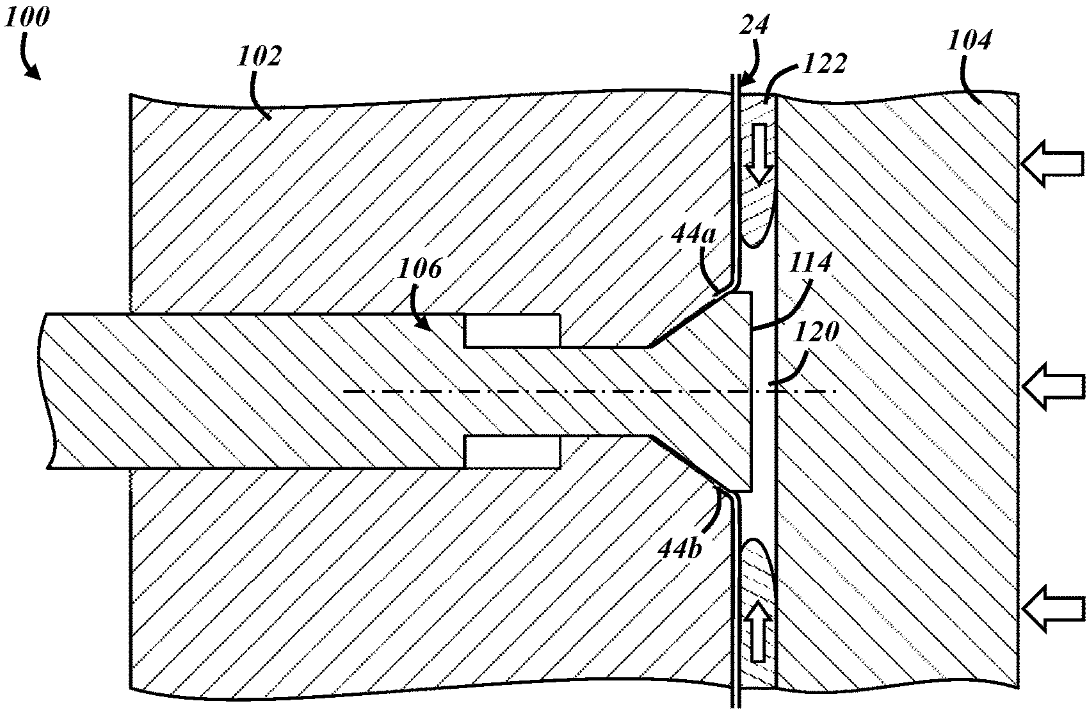
FIG. 6 depicts molding material filling a cavity of the molding tool of FIG. 5.

With reference to FIG. 6, the molding tool 100 is changed to the closed condition to form a mold cavity 120. The relative movement of the opposing tool portions 102, 104 toward the closed condition may at least partially overlap in time with movement of the slide 106 to the retracted condition. The mold cavity 120 is delimited by molding surfaces of the first tool portion 102, the second tool portion 104, and the slide 106. More particularly, a surface of the cavity side 114 of the slide 106 defines a portion of a molding surface that delimits the mold cavity 120. A portion of the reinforcing layer 24 is located within the mold cavity 120, and the opposing edge portions 44*a*, 44*b* are excluded from the mold cavity.

A molding material 122 is then introduced into and fills the mold cavity 120, thereby overmolding the portion of the reinforcing layer 24 in the mold cavity. Notably, the slide 106 and molding tool 100 are configured such that no undercut condition is formed along the slide with respect to the molding material 122. In embodiments where the reinforcing layer 24 includes a relatively soft coating (e.g., plastisol), the reinforcing layer 24 can enhance the seal formed at the interface where the first tool portion 102, the slide 106, and the reinforcing layer meet.

While not shown explicitly here, the first tool portion 102 may provide additional molding surfaces that delimit the mold cavity 120 on the opposite side of the reinforcing layer 24 to form, for example, the network of ribs 36 of FIG. 2, such that part of the cavity 120 is on both opposite faces of the reinforcing layer and the reinforcing layer is overmolded on both sides. The slide 106 may also have additional features, such as one or more protrusions to form the portion of the tear seam 12 of FIG. 2. In embodiments where the second portion 40 of each piece 24*a*, 24*b* of the reinforcing layer is to be embedded in the chute 34 of the panel substrate 20 as in FIG. 2, the reinforcing layer 24 may be pre-formed so that the ends opposite the edge portions 44*a*, 44*b* fit into cavity portions defined in the first tool portion 102 for overmolding.

Figure 7:
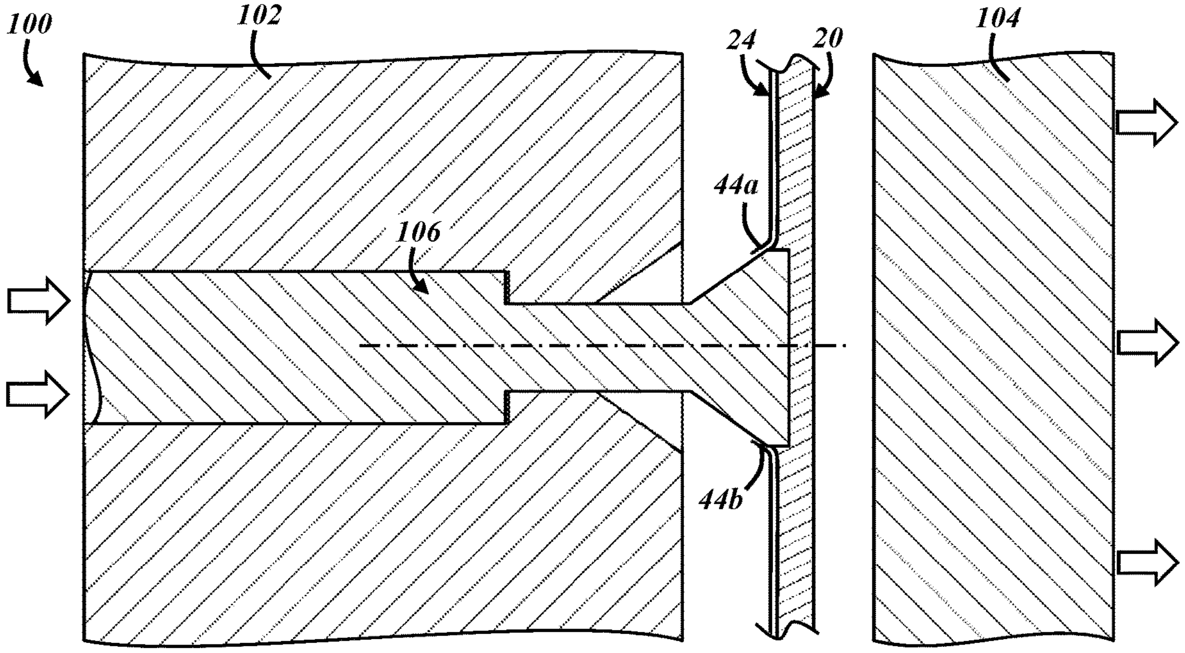
FIG. 7 depicts the molding tool of FIG. 6 changing to an open condition and the slide moving to an extended position.

With reference to FIG. 7, after the molding material 122 has sufficiently cooled or cured, the tool portions 102, 104 are moved away from each other toward the open condition of the molding tool 100. Also, the slide 106 is moved back toward the extended position. These two relative movements may overlap in time, or the tool 100 may be in the open condition before the slide 106 is moved toward the extended position. The molded panel substrate 20 remains in contact with the slide 106 during at least a portion of the movement of the slide 106 toward the extended position to effectively unclamp the edge portions 44*a*, 44*b* from the first tool portion. Slide movement may be coordinated with the movement of ejector pins of the molding tool 100.

Figure 8:
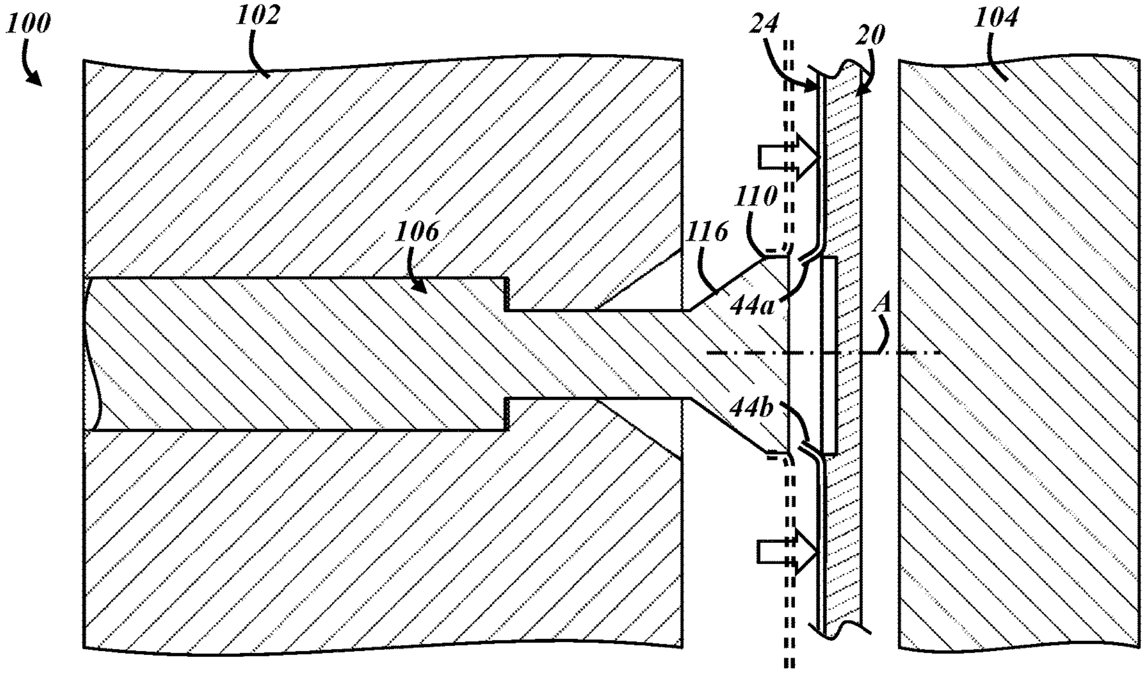
FIG. 8 depicts the molding tool of FIG. 7 with the molded substrate being removed from the slide.

With reference to FIG. 8, once the head 110 of the slide 106 is sufficiently spaced from the first tool portion 102 and/or the first and second tool portions 102, 104 are sufficiently spaced apart, the molded panel substrate 20 can be separated from the slide 106. This can be accomplished via continued extension of ejector pins of the molding tool 100, a stripper plate, and/or partial movement of the slide 106 back toward the retracted position. During separation of the panel substrate 20 from the slide 106, the opposing edge portions 44*a*, 44*b* of the reinforcing layer 24 again interfere with the head 110 of the slide and flex further toward the first tool portion 102. While the edge portions 44*a*, 44*b* are on the clamping side 116 of the head 110 of the slide 106 during molding of the panel substrate 20, they easily pass over the head of the slide after molding, owing to the flexibility of the reinforcing layer 24.

Figure 9:
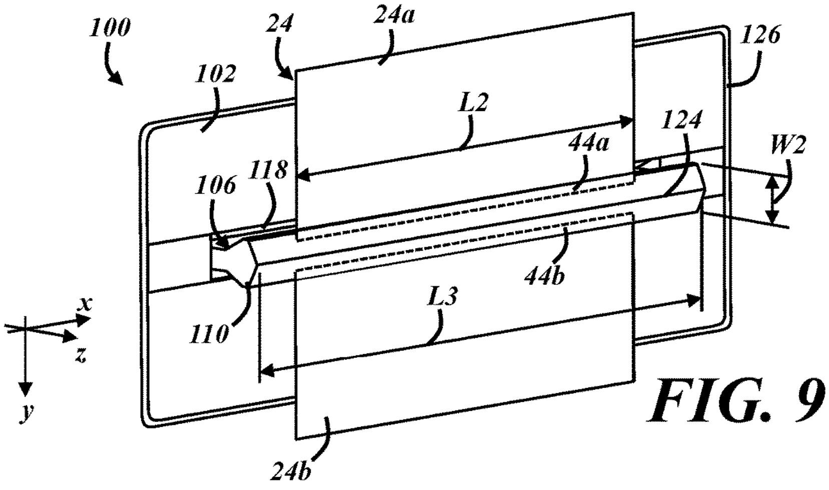
FIG. 9 is an isometric view depicting the reinforcing layer positioned between the slide and a portion of the molding tool as in FIG. 4.

FIG. 9 is a schematic isometric view depicting part of the first tool portion 102 of the molding tool 100. Only the necessary portion of the face of the first tool portion 102 is shown here. Element 126 of FIG. 9 represents a portion of the mold cavity 120 in which the chute 34 of the panel substrate 20 is formed. The airbag door region 14 of the finished panel is thus defined at the inner perimeter of this portion 126 of the mold cavity provided by the first tool portion 102. While not shown here, the reinforcing layer 24 can be folded or preformed so that its ends are received by this portion 126 of the mold cavity for overmolding.

The molding tool 100 and the two-piece reinforcing layer 24 are shown in their relative positions of FIG. 4—which is after the reinforcing layer has been moved toward the first tool portion 102 and beyond the head 110 of the slide 106 but before the slide is moved to the retracted position of FIG. 5. In this example, the cavity side of the head 110 of the slide 106 is illustrated as tapering down from its widest point at W2 to an apex 124 which is at the boundary of the opposing edges 30*a*, 30*b* of the respective airbag doors 16*a*, 16*b* of FIG. 2. This apex 124 of the slide 106 may also function as a lead-in as the reinforcing layer 24 is moved toward the first portion 102 of the molding tool 100 from its initial position between the first and second tool portions.

As illustrated here, an entire length L2 of the opposing edge portions 44*a*, 44*b* is in position to be clamped between the head 110 of the slide 106 and the clamping surface 118 of the first tool portion 102. The length L2 of the reinforcing layer 24 is less than the length L3 of the slide 106. This ability to clamp, and thereby secure, entire edge portions 44*a*, 44*b* of the reinforcing layer 24 ensures that the reinforcing layer remains in the desired location within the mold cavity 120 and in the finished panel substrate 20 and the finished vehicle interior panel 10. Further, this robust securing of the reinforcing layer 24 in the mold cavity 120 offers a much larger panel molding process window. In other words, without the clamping of the reinforcing layer in the molding tool 100, process parameters such as injection pressure, melt temperature, coolant temperature, etc. must be closely monitored and cannot be varied much without causing unwanted movement of the reinforcing layer 24 in the mold cavity 120. In such cases, processing parameters cannot be adjusted to address other problems like short shots, sink marks, or dimensional variations without causing a problem with movement of the reinforcing layer.

Figure 10:
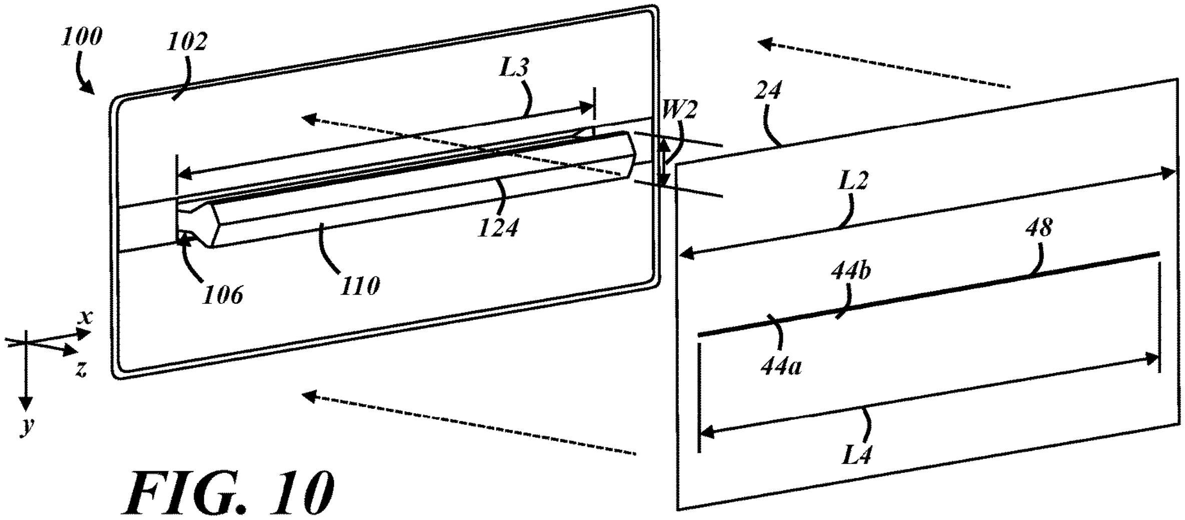
FIG. 10 is an isometric view depicting opposing edge portions along an opening in a one-piece reinforcing layer aligned with the slide of the molding tool.
Figure 11:
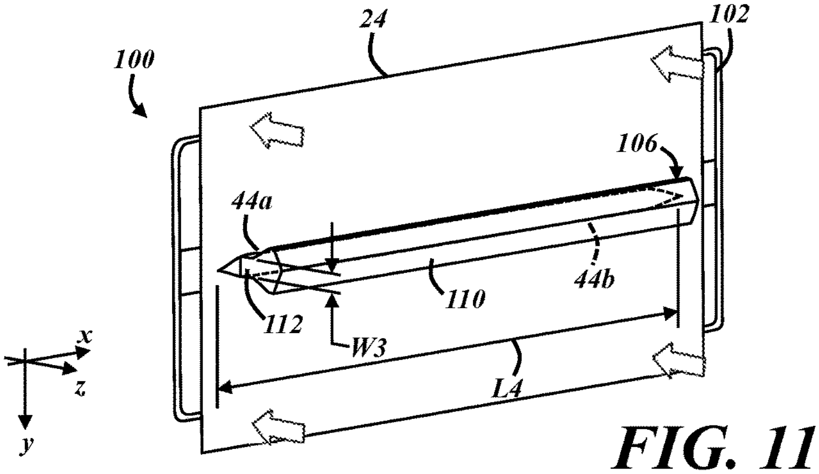
FIG. 11 depicts the reinforcing layer of FIG. 10 after moving past the head of the slide.

FIGS. 10 and 11 depict a variant of the above-described process in which the reinforcing layer 24 is a single piece with an opening 48 formed through its thickness. In this example, the opening 48 is in the form of a slit contained entirely within the outer periphery of the reinforcing layer 24. The length L2 of the reinforcing layer 24 is greater than the length L3 of the slide 106, and the length L4 of the slit 48 is less than the length L2 of the reinforcing layer 24 but greater than the length L3 of the slide 106. The opposing edges portions 44*a*, 44*b* in this case lie along the slit 48 such that the distance between them—measured in the same direction as the width W2 of the head of the slide 106—is effectively zero when the reinforcing layer 24 is initially positioned between the first and second tool portions 102, 104 of the molding tool. In some embodiments, the slit 48 is replaced with an aperture formed where material has been removed from the reinforcing layer 24 (e.g., a rectangular opening). The aperture may have a length L4 less than the length L2 of the reinforcing layer with the edge portions 44*a*, 44*b* spaced apart by a non-zero distance D, similar to FIG. 3.

In either case, the process may proceed the same as in FIGS. 3-8. The reinforcing layer 24 is positioned between the extended slide 106 and the second tool portion 104 with the molding tool in the open condition as in FIG. 10 with the opening 48 aligned with the slide 106. The reinforcing layer 24 is then moved toward the first tool portion 102 until the edge portions 44*a*, 44*b* are between the head 110 of the slide and the first tool portion, as in FIG. 11. As in the previous example, the opposing edge portions 44*a*, 44*b* make sliding contact with the head 110 of the slide 106 and flex toward the second tool portion 104 during this movement. The additional length L4 of the slit 48 relative to that of the slide 106 permits the slit to open wide enough for the head 110 of the slide to pass through. At this point, the distance between the edge portions 44*a*, 44*b* is equal to the width W3 of the neck 112 of the slide 106. The slide 106 is then retracted to flex the edge portions 44*a*, 44*b* toward the first tool portion 102 and clamp them there, the molding tool 100 is closed, and molding material is introduced to the mold cavity to form the panel substrate 20.

Figure 12:
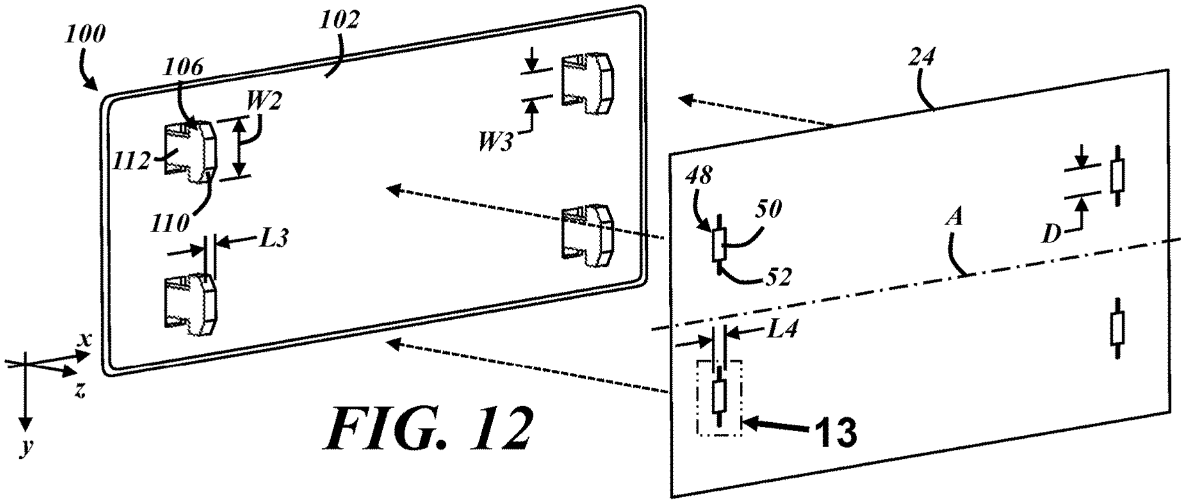
FIG. 12 is an isometric view depicting opposing edge portions along openings in a one-piece reinforcing layer aligned with respective slides of the molding tool.

FIGS. 12-15 depict another variant of the above-described process in which the reinforcing layer 24 is a single piece with a plurality of openings 48 formed through its thickness and entirely contained within the periphery of the reinforcing layer. With reference to FIG. 12, each of the openings 48 is located away from the central plane A of the panel substrate to be molded and includes both an aperture 50, defined where material has been removed from the reinforcing layer, and a slit 52, defined through the reinforcing layer without removal of material. The molding tool 100 includes a corresponding plurality of slides 106 associated with the first tool portion 102. Each of these slides 106 is similar to a fractional lengthwise segment of the slides in the previous figures. Here, the respective lengths L3, L4 of each slide 106 and each opening 48 are a fraction of those in FIGS. 10 and 11 and are approximately equal to each other.

Figure 13:
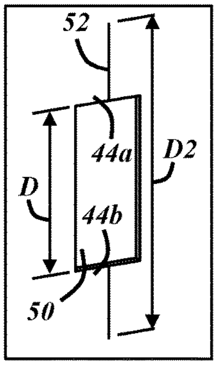
FIG. 13 is an enlarged view of one of the openings of the reinforcing layer of FIG. 2.
Figure 14:
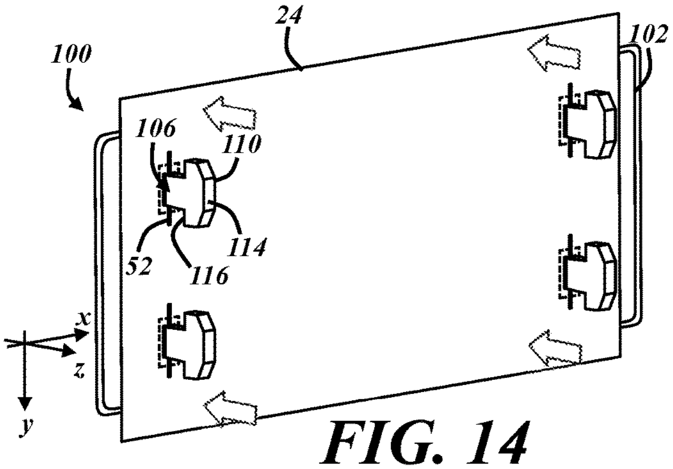
FIG. 14 depicts the reinforcing layer of FIG. 12 after moving past the heads of the respective slides.

With additional reference to FIG. 13, the distance D between opposing edge portions 44*a*, 44*b* of the reinforcing layer 24 is approximately equal to the width W3 of the neck 112 (FIG. 12) of each slide 106 and less that the maximum width W2 of the head 110 of each slide, as in the example of FIGS. 3-8. The slit 52 of each opening 48 is oriented perpendicular to the central plane A, and a distance D2 between the opposite ends of the slit 52 is greater than the maximum width W2 of the head 110 of each slide 106. The slit 52 bisects each of the opposing edge portions 44*a*, 44*b* of the reinforcing layer 24.

The process may proceed generally the same as those depicted in FIGS. 3-8 and 9-11. The reinforcing layer 24 is initially positioned between the second tool portion (not shown) and the slides 106 with each opening 48 and its respective edge portions 44*a*, 44*b* aligned with a respective one of the slides, which are in the extended position in FIG. 12. The reinforcing layer 24 is then moved toward the first tool portion 102 until the edge portions 44*a*, 44*b* are between the head 110 of the respective slide 106 and the first tool portion, as in FIG. 14. As in the previous examples, the opposing edge portions 44*a*, 44*b* make sliding contact with the head 110 of the slide 106 and flex toward the second tool portion 104 during this movement. The additional distance D2 between the ends of each slit 52 relative to the distance D between the opposing edge portions 44*a*, 44*b* permits each edge portion to temporarily split along the slit 52 enough for the head 110 of the slide to pass through. One half of each opposing edge portion 44*a*, 44*b* of the reinforcing layer 24 thus slides across opposite corners of the head 110 of the slide 106 and flexes away from the first tool portion 102 during movement of the layer past the head.

Figure 15:
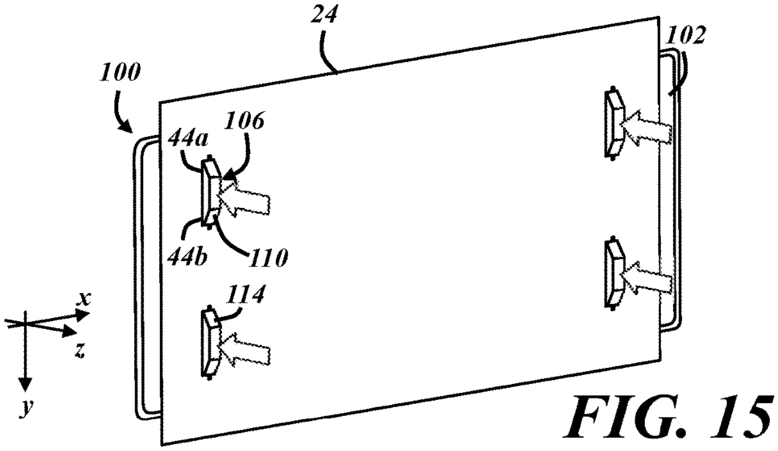
FIG. 15 depicts the slides of FIG. 14 after moving to the retracted position.

As shown in FIG. 15, the slides 106 are then moved to the retracted position to clamp opposing edge portions 44*a*, 44*b* of the reinforcing layer 24 between the head 110 of the respective slide and a clamping surface of the first tool portion 102. While not illustrated in detail in FIGS. 12-15, the clamping surface may be similar to the clamping surface 118 of FIGS. 3-11—i.e., an inclined or recessed surface aligned with and complementary in shape with the clamping side 116 (FIG. 14) of the head 110 of each slide 106. With the slides 106 retracted as in FIG. 15 and the molding tool 100 in the closed condition, the opposing edge portions 44*a*, 44*b* of the reinforcing layer 24 are excluded from the mold cavity, and the cavity side 114 of the head 110 of each slide 106 forms a portion of the molding surface delimiting the mold cavity. A locally thin area or a through opening is formed in the airbag door region of the finished panel by the head 110 of each slide 106. As in the previous examples, the amount the cavity side 114 of the head 110 of each slide 106 extends beyond the reinforcing layer 24 (in the z-direction of the figures) when the reinforcing layer is clamped in the molding tool 100 with the slide(s) in the retracted position is less than or equal to the nominal thickness of the finished panel substrate in the airbag door region.

In some embodiments, the molding tool 100 includes a central slide 106 along the central plane A of the panel to be molded, as in FIGS. 3-11, along with one or more additional slides 106 located away from the central plane A. The central slide may, for example, clamp the entire length L2 of opposing edge portions 44*a*, 44*b* of the reinforcing layer 24 to the first tool portion 102 near the central plane A, as in FIGS. 3-9, with additional slides locally clamping additional edge portions located along through-openings 48 to the first tool portion 102 at locations away from the central slide.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle interior panel for use over an airbag, comprising:

a panel substrate formed from a molding material;

a tear seam along which the panel splits during deployment of an underlying airbag, the tear seam having an areal extent that defines an airbag door region of the panel; and a flexible reinforcing layer, wherein a portion of the reinforcing layer is overmolded with the molding material and embedded in the airbag door region of the panel, and wherein opposing edge portions of the flexible reinforcing layer are devoid of the molding material.

2. The vehicle interior panel of claim 1, wherein an entire length of each edge portion is devoid of the molding material.

3. The vehicle interior panel of claim 1, wherein the tear seam is an H-shaped tear seam.

4. The vehicle interior panel of claim 1, wherein the opposing edge portions extend along a back side of opposing airbag doors of the panel.

5. The vehicle interior panel of claim 1, wherein another portion of the reinforcing layer is overmolded with the molding material and embedded in a wall of a chute of the panel substrate.

6. A method of making the vehicle interior panel set forth in claim 1, the method comprising:

filling a mold cavity of a molding tool with the molding material to form the panel substrate while the opposing edge portions of the flexible reinforcing layer are clamped in the molding tool, wherein the portion of the reinforcing layer is overmolded with the molding material and embedded in the airbag door region of the panel.

7. The method of claim 6, wherein the flexible reinforcing layer includes separate first and second pieces each providing one of the opposing edge portions, a portion of the first piece being embedded in a first airbag door of the panel and a portion of the second piece being embedded in a second airbag door of the panel opposing the first airbag door.

8. The method of claim 6, wherein the molding tool includes a slide, the method further comprising clamping the opposing edge portions of the reinforcing layer between the slide and a clamping surface of the molding tool before the step of filling the mold cavity, the slide defining a portion of the molding surface delimiting the mold cavity.

9. The method of claim 8, wherein the slide is configured to prevent an undercut condition with the molding material.

10. The method of claim 6, wherein the molding tool includes a slide, the method further comprising:

positioning the opposing edge portions between a head of the slide and a clamping surface of the molding tool while the molding tool is in an open condition and the slide is in an extended position; and clamping the opposing edge portions between the head of the slide and the clamping surface of the molding tool by moving the slide to a retracted position before the step of filling.

11. The method of claim 10, wherein a distance between the edge portions is less than a width of the head of the slide before and after the step of positioning such that the edge portions are in sliding contact with the head of the slide during the step of positioning and before the step of clamping.

12. The method of claim 10, wherein a clamping side of the head of the slide tapers away from a cavity side of the head of the slide.

13. The method of claim 6, wherein the edge portions are defined along an opening formed through the reinforcing layer.

14. The method of claim 13, wherein the reinforcing layer is provided as a single piece.

15. The method of claim 13, wherein the opening is a slit.

16. The method of claim 13, wherein the opening includes a slit and an aperture located along the slit.

17. The method of claim 6, wherein an entire length of each edge portion is clamped in the molding tool during the step of filling.

18. The method of claim 6, wherein each edge portion extends away from a back side of the airbag door region of the panel.

19. The method of claim 6, further comprising, before the step of filling:

(a) positioning the flexible reinforcing layer between first and second tool portions of the molding tool with the molding tool in an open condition and with a slide in an extended position and the opposing edge portions aligned with the slide;

(b) moving the reinforcing layer and the first tool portion relative to each other until the edge portions are located between a head of the slide and a clamping surface of the first tool portion;

(c) retracting the slide toward the clamping surface to a retracted position such that the edge portions are clamped between the head of the slide and the clamping surface;

(d) moving the first and second tool portions toward each other to change the molding tool to a closed condition to form the mold cavity; and (e) removing the panel substrate from the molding tool after the step of filling.

20. The method of claim 19, wherein a distance between the edge portions before and after step (b) is less than a width of the head of the slide such that the edge portions: flex away from the first tool portion during step (b), flex toward the first tool portion during step (c), and flex toward the first tool portion during step (e).

* * * * *